(12) United States Patent
Natale et al.

(10) Patent No.: US 11,148,356 B2
(45) Date of Patent: Oct. 19, 2021

(54) APPARATUS AND METHOD FOR THREE-DIMENSIONAL PRINTING OF CONTINUOUS FIBRE COMPOSITE MATERIALS

(71) Applicant: POLITECNICO DI MILANO, Milan (IT)

(72) Inventors: Gabriele Natale, Milan (IT); Marinella Levi, Milan (IT); Giovanni Postiglione, Milan (IT)

(73) Assignee: MOI COMPOSITES S.R.L., Milan (IT)

( * ) Notice: Subject to any disclaimer, the term of this patent is extended or adjusted under 35 U.S.C. 154(b) by 268 days.

(21) Appl. No.: 15/776,500

(22) PCT Filed: Nov. 17, 2016

(86) PCT No.: PCT/IB2016/056912
§ 371 (c)(1),
(2) Date: May 16, 2018

(87) PCT Pub. No.: WO2017/085649
PCT Pub. Date: May 26, 2017

(65) Prior Publication Data
US 2018/0370129 A1 Dec. 27, 2018

(30) Foreign Application Priority Data
Nov. 17, 2015 (IT) .......................... 102015000073191

(51) Int. Cl.
*B29C 64/118* (2017.01)
*B33Y 10/00* (2015.01)
(Continued)

(52) U.S. Cl.
CPC .......... *B29C 64/118* (2017.08); *B29C 64/165* (2017.08); *B29C 64/209* (2017.08);
(Continued)

(58) Field of Classification Search
CPC .... B29C 70/382; B29C 64/336; B29C 64/118
See application file for complete search history.

(56) References Cited

U.S. PATENT DOCUMENTS

| 6,934,600 B2 * | 8/2005 | Jang ....................... B82Y 30/00 |
| | | 700/182 |
| 2002/0121712 A1 * | 9/2002 | Schroeder ............... B29C 70/50 |
| | | 264/40.1 |

(Continued)

OTHER PUBLICATIONS

International Search Report and Written Opinion dated Mar. 8, 2017 from counterpart PCT App PCT/IB2016/056912.

*Primary Examiner* — Jacob T Minskey
*Assistant Examiner* — Adrien J Bernard
(74) *Attorney, Agent, or Firm* — Shuttleworth & Ingersoll, PLC; Timothy Klima

(57) ABSTRACT

An apparatus and method for three-dimensional printing of composite materials of continuous fibre, in which a feed head for feeding a compound material of continuous fibre is moved so as to print a three-dimensional object; a means for relative movement between the feed head and the three-dimensional object exerts a drawing force on the compound material of continuous fibre, so as to bring about the feeding of the material; this material is realized at a station arranged upstream of the feed head.

18 Claims, 2 Drawing Sheets

(51) Int. Cl.
    *B33Y 30/00*     (2015.01)
    *B29C 70/38*     (2006.01)
    *B29C 70/16*     (2006.01)
    *B29C 64/321*     (2017.01)
    *B33Y 40/00*     (2020.01)
    *B29C 64/314*     (2017.01)
    *B29C 64/245*     (2017.01)
    *B29C 64/209*     (2017.01)
    *B29C 64/165*     (2017.01)
    *B29C 64/336*     (2017.01)
    *B29K 105/10*     (2006.01)

(52) U.S. Cl.
    CPC .......... *B29C 64/245* (2017.08); *B29C 64/314* (2017.08); *B29C 64/321* (2017.08); *B29C 64/336* (2017.08); *B29C 70/16* (2013.01); *B29C 70/382* (2013.01); *B33Y 10/00* (2014.12); *B33Y 30/00* (2014.12); *B33Y 40/00* (2014.12); *B29K 2105/10* (2013.01)

(56) References Cited

U.S. PATENT DOCUMENTS

2014/0061974 A1    3/2014   Tyler
2017/0015060 A1*  1/2017   Lewicki ................ B29C 64/118

\* cited by examiner

APPARATUS AND METHOD FOR THREE-DIMENSIONAL PRINTING OF CONTINUOUS FIBRE COMPOSITE MATERIALS

This application is the National Phase of International Application PCT/IB2016/056912 filed Nov. 17, 2016 which designated the U.S.

This application claims priority to Italian Patent Application No. 102015000073191 filed Nov. 17, 2015, which application is incorporated by reference herein.

The object of the present invention is an apparatus and method for three-dimensional printing of continuous fibre composite materials.

As is known, three-dimensional printing or 3D printing is a process that makes it possible to create objects based on digitized models using suitable modelling software.

Among 3D printing apparatuses, extrusion 3D printers are the ones most used and they have seen widespread distribution. These printers realize the object to be printed by means of the extrusion of specific materials, generally thermoplastic and thermosetting polymeric materials, metal materials and ceramic materials.

Such apparatuses are based on the extrusion of material that passes from a liquid state to a solid state. For example, for 3D printing using thermoplastic materials, the polymer is extruded in the molten state and then, as it cools, it solidifies, producing the final form of the object.

Production of the object takes place by means of the movement of the extrusion head and/or the plate supporting the object to be printed, so as to enable the deposition of overlapping layers of material that results in the creation of the desired form To enable this movement and thus enable deposition of the material along a predefined path (determined by the digitized model), mechanical movement systems with three axes are generally used for moving the extrusion head.

Also known are three-dimensional printing apparatuses that are capable of realizing objects, again by extrusion printing, using composite materials constituted by a polymeric matrix and by metal or ceramic fillers. However, the latter are in the form of particulate matter or short fibres that are dispersed in the matrix prior to the printing process.

Accordingly, such apparatuses are limited as concerns the use of composite material, as they cannot be used to extrude continuous fibre composite material, that is to say, material having a long fibre that is deposited in the extrusion stage.

In this regard, it should be specified that 3D printing of continuous fibre composite material offers numerous advantages, mainly deriving from the possibility of realizing any 3D form, using resins, including thermosetting resins, optimizing fibre orientation, thus maximizing performance of the printed object and not necessarily using supports for the hollow and/or projecting parts.

In fact, in the case of 3D printing of objects reinforced with long or short fibres for example, the use of thermoplastic matrices leads to intrinsic limitations regarding the mechanical performance and the durability of these objects.

To realize objects having hollow internal parts, printing with a conventional composite material (i.e., with short fibres) necessarily calls for the use of supports that define the cavity of the form and on which the extruded material is deposited. This support is eliminated upon completion of the printing process for the object.

Generally, long-fibre composite material is used to realize hollow portions, or sections spaced away from the supporting base, owing to the supporting capacity of the fibre, thus eliminating the use of the above-mentioned supports.

To enable the printing of continuous fibre material, apparatuses such as those described in patent application US2014/0061974 are used for example; they have a continuous long-fibre feed system, suitable for conveying the fibre to the extrusion head.

In particular, in this solution, the extrusion head has a lateral inlet (with respect to the feed direction) for the fibre, which comes out from the extrusion opening together with the respective polymeric matrix.

The material is thus realized directly in the extrusion head, joining the fibre with the matrix during extrusion of the composite material.

Moreover, in this solution, extrusion of the matrix determines an outlet flow of the matrix, which, as it joins with the fibre, directs the fibre out from the extrusion head.

In other words, the fibre is supplied by the effect of the advancement of the matrix (in the liquid state), which has a suitable viscosity capable of adhering and directing the fibre out of the print head.

Although this solution is capable of printing a continuous fibre composite material with thermosetting matrices, it does, however, have a significant drawback.

In the first place, it should be considered that the step of joining the fibre with the matrix does not ensure proper distribution of the liquid matrix along the entire extension of the continuous fibre.

This inconvenience originates precisely from the fact that the fibre is supplied simultaneously with the matrix only in the extrusion stage. Accordingly, the contact between the fibre and the matrix is not always sufficient for proper impregnation of the fibre.

This drawback becomes even more serious with the use of continuous fibres obtained from very compact strands that thus block internal impregnation of the fibre. In this case, the matrix is deposited only on the external surface of the fibre, creating a composite material the final structure of which is not homogeneous.

Additionally, the material making up the matrix (polymer resin) also makes proper impregnation of the fibre difficult. In fact, as defined above, in this case the resin must necessarily have a particularly high viscosity in order to be extruded.

As a result, proper impregnation of the fibre proves to be even more difficult with high-viscosity resins, which thus have greater difficulty in penetrating between the fibre filaments.

By contrast, the use of a resin that is less viscous and therefore capable of impregnating the fibre to a greater degree would lead to a significant disadvantage in the procedures for drawing the fibre. In this situation, the fibre would not be drawn by the resin, which, because it has a very low viscosity, would not be capable of adhering to the fibre itself.

In this context, the technical task underlying the present invention is to offer an apparatus and a method for three-dimensional printing of continuous fibre composite materials which overcome the above-mentioned drawbacks of the prior art cited hereinabove.

In particular, an aim of the present invention is to make available a three-dimensional printing device and relative method that are capable of printing using continuous fibre composite materials, with the consequent advantages resulting precisely from the use of a long fibre and from the use of thermosetting resins.

Specifically, an aim of the present invention is to make available a device and a relative method for three-dimensional printing using continuous fibre composite materials which are capable of properly realizing the composite material, uniformly impregnating the fibre with the respective matrix.

Even more specifically, an aim of the present invention is make available a device and a relative method for three-dimensional printing of continuous fibre composite materials, said device and method being versatile and thus usable with any type of fibre and matrix, without jeopardizing the structural characteristics of the material itself.

A further aim of the present invention is to offer an apparatus and method for three-dimensional printing using continuous fibre composite materials, said apparatus and method being versatile and simple and in terms of structure and the costs of realization.

The defined technical task and the specified aims are substantially achieved by an apparatus and method for printing continuous fibre composite material, comprising the technical characteristics set forth in one or more of the appended claims.

In particular, the present invention comprises an apparatus for three-dimensional printing of continuous fibre composite materials that has a feed head for feeding a continuous fibre compound material and that is configured to print a three-dimensional object. Also provided is a means for relative movement between the feed head and the three-dimensional object so as to exert a drawing force on the continuous fibre compound material and thus feed the material out from the head. The compound material is realized in a station arranged upstream of the feed head.

In a similar manner, the present invention also comprises a method for three-dimensional printing of continuous fibre composite materials, in which the material is realized by immersing a continuous fibre in a resin. Subsequently, the compound material thus formed is supplied from the print head so as to print the three-dimensional object.

This feeding process is implemented by exerting a drawing force on the compound material by means of relative movement between the feed head for feeding the material and the three-dimensional object Further characteristics and advantages of the present invention will become more apparent from the approximate and thus non-limiting description of a preferred, but not exclusive, embodiment of an apparatus and method for three-dimensional printing of continuous fibre composite material, as illustrated in the accompanying drawings, of which:

FIG. 1a is an enlarged perspective view of a structural detail of FIG. 1; and

Figure 1:
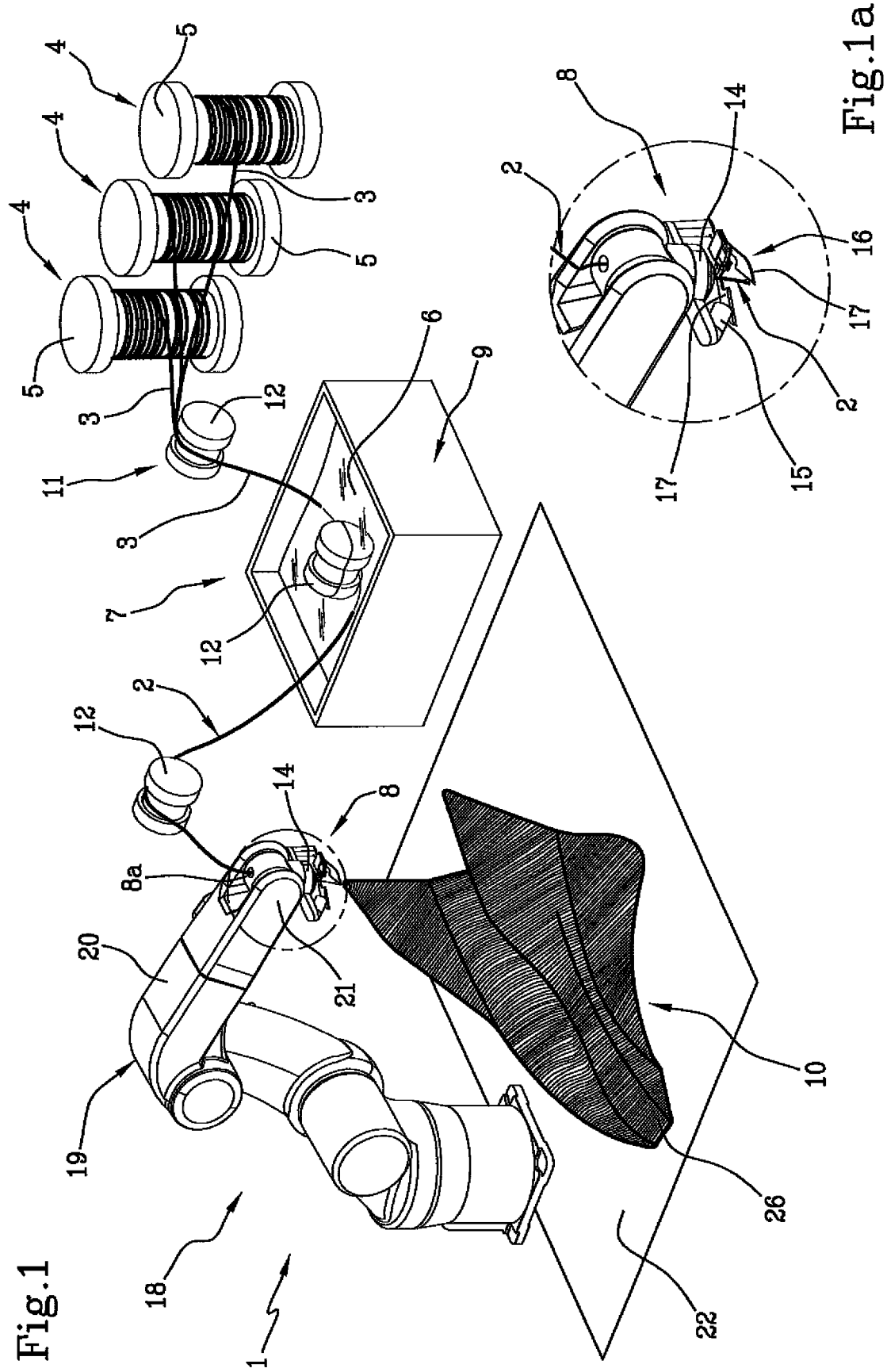
FIG. 1 is a schematic perspective view of an apparatus for three-dimensional printing of continuous fibre composite material according to a possible embodiment of the present invention.

With reference to the attached figures, an apparatus for three-dimensional printing of continuous fibre composite materials 3 is indicated in its entirety by the number 1.

In particular, the present invention is suited to printing a compound material 2 made up of at least two steps: at least one continuous fibre 3 (or long fibre), which has the task of sustaining the fillers; the matrix, which keeps the fibres 3 joined together, protecting them from the external environment; and possibly other additives and reinforcements.

Referring to FIG. 1, a number of fibres 3, suitably joined together in a step of realizing the compound material 2, can be processed so as to constitute a single body. The fibres 3 can also be constituted by different materials, including for example glass fibre, carbon fibre, Kevlar fibre, basalt fibre, natural fibres, etc.

The fibres 3, which must be supplied continuously, are preferably collected on an element 4, such as a cylindrical spool 5 around which the fibre 3 is wound. Advantageously, during the printing stages, the spool 5 is unwound for continuous feeding of the fibre 3. As illustrated in FIG. 1, in the case of a plurality of different fibres 3, a spool 5 is provided for each fibre.

As regards the matrix, a resin 6 in the liquid state is used, particularly a thermosetting resin 6 for example an epoxy, acrylic, polyester resin etc., that can be reticulated by using various stimuli added to the system (light radiation, heat energy, chemical stimuli including contact between reactive components etc.).

In particular, the apparatus 1 comprises a station 7 for realizing the compound material 2.

The station 7 is arranged upstream of a feed head 8 for feeding the compound material 2 suitable for printing a three-dimensional object 10, as shall be clarified in further detail herein below in this description.

In further detail, the station 7 for realizing the compound material 2 has at least one basin 9 for containing the above-mentioned resin 6 and inside of which at least one fibre 3 is immersed.

Advantageously, the continuously fed fibre 3 that is unwound from the respective spool 5 is passed inside the basin 9. In this situation, the fibre 3 is completely immersed in the resin 6.

Passage of the fibre 3 in the resin 6 thus ensures proper impregnation of the fibre 3, guaranteeing homogeneous distribution of the resin 6 on the respective fibre 3. In this regard, it should be specified that a longer or shorter length of time for the fibre 3 to remain in the basin 9 can be pre-established as a function of the viscosity of the resin 6 and the structure of the fibre 3.

Advantageously, for particularly viscous resins 6 and/or for fibres 3 constituted by very compact filaments, passage inside the basin 9 is prolonged so as to ensure proper (homogeneous) impregnation of the fibre 3 with the resin 6.

In this regard, a plurality of basins 9 can also be provided, arranged in a series so as to implement a repeated passage of the fibre 3 inside each basin 9 containing the resin 6, and/or even chemically different resins, useful for example for chemical activation using bicomponent systems. This solution, which is not illustrated in the attached figures, is also aimed at providing greater and homogeneous impregnation of the fibre 3 with the resin 6, as well as at providing for versatility in the production of composites having different and optimized matrixes.

With reference to the attached figures, the station 7 for realizing the compound material comprises a feed line 11 for feeding the continuous fibre 3 and that is suitable for guiding the same fibre 3 from the above-mentioned collection element 4, through the basin 9, and to the feed head 8.

In particular, according to the first embodiment shown in FIG. 1, the feed line 11 is made up of a plurality of idler rollers 12 that are mounted idly or motorized, as a function of the complexity of the fibre feed line.

It should be specified that there may be any number of rollers 12 and any arrangement thereof, as a function of the extension of the line 11 and as a function of the length and the path that the fibre 3 must travel during its advancement.

In the solution illustrated by way of example in FIG. 1, which is thus non-limiting, three rollers 12 are provided, arranged between the collection elements 4 and the basin 9, inside the basin 9, and between the basin 9 and the feed head 8, respectively.

In particular, the first roller 12 arranged upstream of the basin 9 correctly directs the fibre 3 inside the basin 9. The second roller 12 arranged in the basin 9 is suited to keeping the fibre 3 immersed in the resin 6 during advancement of the same fibre 3.

The third roller downstream of the basin 9 directs the compound material 2 formed in the basin 9 to the feed head 8.

Note also that in this solution, the basin 9 is detached from the feed head 8. This basin 9, which is open in FIG. 1 in order to show the resin 6 contained therein, is preferably shielded from any source of interference with the activation of the resin 6 and/or degradation of the resin itself (e.g. light radiation, heat, moisture, oxygen, etc.).

This shielding is of a known type and therefore not described in detail herein; it is necessary in that the resin 6, for example in the case in which it is a photopolymer that can be polymerized, transitioning from a liquid to a solid state, by the action of light.

Figure 2:
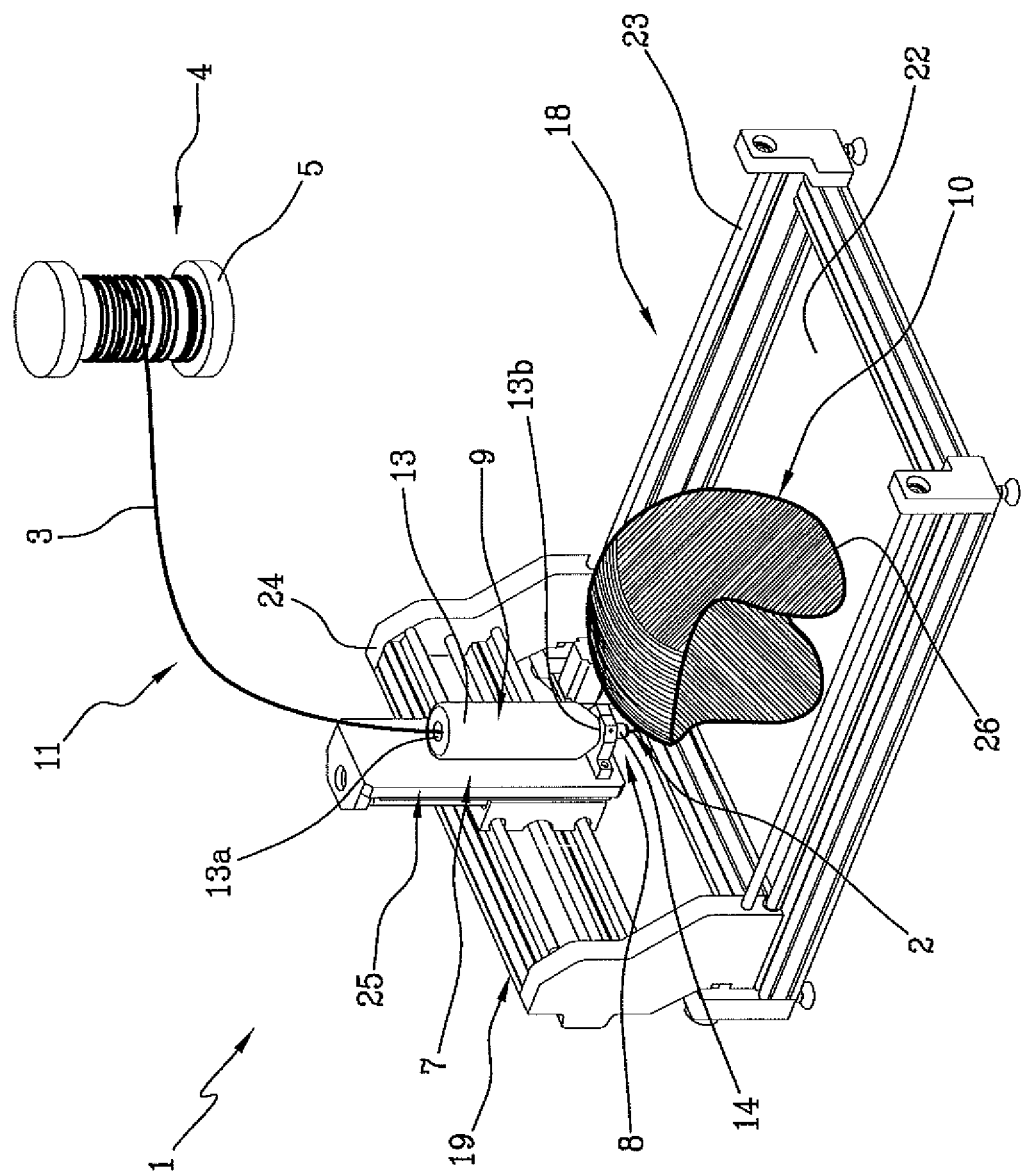
FIG. 2 is a schematic perspective view of an apparatus for three-dimensional printing of continuous fibre composite material according to an additional embodiment of the present invention.

In accordance with a second embodiment shown in FIG. 2, the basin 9 containing the resin is constituted by a feeder 13 that has a first open inlet end 13a for the continuous fibre 3, and opposite the first end 13a, a second open exit end 13b (partially visible in FIG. 2) for the compound material 2.

In this situation, the feed line 11 may not have idler rollers in that the fibre 3 can be directly supplied inside the first open end 13a of the feeder 13 containing the resin 6.

Moreover, in the present embodiment, the second open end 13b defines the above-mentioned feed head 8 for feeding the compound material 2.

In other words, the feed head 8 is in fact constituted by the second end 13b of the feeder 13 from which the compound material 2 realized inside the same feeder 13 exits.

In particular, the feed head 8 comprises an outlet nozzle 14 for the compound material 2, and which in the embodiment shown in FIG. 2 is constituted by the second end 13b of the feeder 13.

The nozzle 14 has a section for passage of the compound material 2 dimensioned as a function of the cross section of the fibre 3. In fact, the fibre 3 must have cross-sectional dimensions that are identical to the section for passage of the nozzle 14 so as to prevent excess resin 6 from dripping from the nozzle 14 or drops of resin 6 from forming on the fibre 3, thus creating defects in the final product.

The head 8 further comprises a polymerization member 15 arranged at the nozzle 14, for polymerizing the material leaving the above-mentioned nozzle 14 and for defining the composite material.

The polymerization member 15 can be of various types, according to the resin 6 and the respective reticulation characteristics.

According to a first embodiment, the polymerization member 15 can be of a type using electromagnetic radiation.

In this case, the member 15 can for example be constituted by at least one UV light LED, or a laser emitter (FIG. 1a), or any other source of electromagnetic radiation positioned on the feed head 8 and directed in an exit zone for the material 2 leaving the nozzle 14.

In a second embodiment, the polymerization member 15 can be constituted by a heat-emitting source provided to heat the material 2 leaving the nozzle 14. Polymerization members 15 of this type are used in the case of heat-activated resins and they are generally based on the supply of a flow of warm air or a laser source.

According to a further embodiment, the polymerization member 15 can also be constituted by an activator of a chemical type, which, in contact with the resin 6, reacts by polymerizing the same resin 6. In particular, in this case the resin 6 is a bicomponent resin in that the two components of the resin 6 are joined so as to implement the above-mentioned reaction.

Advantageously, the chemical reaction step can be implemented upstream of the feed head 8 through passage of the fibre in a series of tanks containing respective components, which, in contact with each other, activate the polymerization reaction. In this case, the step of reticulating the resin 6 continues during extrusion of the material 2 from the head 8 and it is completed once the material has been deposited so as to form the object 10.

Alternatively, the chemical substance for activating polymerization can be sprayed on the fibre along the above-mentioned feed line 11.

Additionally, the polymerization member 15 can be of a combined type and thus implement different steps of resin reticulation.

For example, the polymerization step can be constituted by a first step of a type with electromagnetic radiation to activate only one part of the resin 6, obtaining a semi-finished product, and a second step of a thermal type to complete the polymerization process. The second reticulation step can be implemented following deposition of the material 2.

The type of polymerization (thermal and/or light and or chemical polymerization) and the sequence of partial activation of the reticulation steps are defined as a function of the reticulation times of the resin and the need to obtain a semi-finished product.

Advantageously, in the case of photo-activated and/or heat-activated resins, to prevent reticulation of the resin 6 before the latter is actually extruded, a nozzle 14 is used that is capable of shielding the same resin from the polymerization apparatus (e.g. a nozzle made of metal but also of a shielding polymer material, of a ceramic material etc.).

The kinetics of the reticulation of the resin 6 influences the printing speed (generally on the order of seconds) and therefore the time needed to realize the object 10 is directly dependent upon the reticulation rate of the resin 6.

The position, distance, intensity and wavelength of the light radiation, in the case of photo-activated resins, are thus essential parameters for the optimal realization of a manufactured article, as is the intensity of the heat radiation in the case of heat-activated resins. Advantageously, in the case of photo-activated resins, to optimize the reticulation process, the wavelength of the light emitted by the source is made to coincide with the absorption peak of the initiator of the photo-reticulable resin.

According to the embodiment shown in FIG. 1, the feed head 8 also has an inlet hole 8a of the compound material 2, arranged on the opposite end with respect to the nozzle 14; said feed line 11 feeding the material 2 inside said hole 8a.

The feed head 8 can further comprise a cutting member 16 for cutting the compound material 2 and configured to interrupt the supply of the material 2 leaving the nozzle 14.

As illustrated in greater detail in the enlargement appearing in FIG. 1a, the cutting member 16 is preferably constituted by a pair of blades 17 that are movable towards/away from each other to cut the compound material 2 upon completion of the feeding step and to obtain single pieces of material 2.

In this case as well, the movement system for moving the blades 17 is not described in detail as it is of a known type.

The feed head 8 is advantageously supported by respective means 18 for relative movement between the same feed head 8 and the three-dimensional object 10.

During the feeding of the compound material 2, the movement means 18 exerts a drawing force on the compound material 2 and thus also on the continuous fibre 3.

In other words, the relative movement between the head 8 and the object 10 determines a drawing action on the material 2 during the extrusion process thereof. Accordingly, this drawing force is also transferred to the fibre 3, which is unwound from the respective spool 5 (mounted rotatably or adequately motorized, to unwind the fibre). Note that this drawing force brings about the feeding of the same fibre along the feed line 11, through the basin 9 and inside the head 8. Accordingly, the greater the relative speed, the faster the advancement of the fibre along the line (and thus the shorter the time that the fibre 3 will remain in the resin 6).

In further detail, the movement means 18 comprises at least one machine 19 having numerically controlled movement along at least three axes.

According to the first embodiment shown in FIG. 1, the numerically controlled machine 19 comprises a motorized arm 20 for supporting the above-mentioned feed head 8 at a respective end portion 21.

The motorized arm 20, which is not described or illustrated in detail in that it is of a known type, is suitable for moving the head in the three spatial axes, orienting the head 8 according to any position with respect to the object 10 and with respect to a support surface 22 on which the object 10 is positioned in the printing process.

In the embodiment appearing in FIG. 2, the numerically controlled machine 19 has a frame 23 within which the above-mentioned support surface 22 extends.

The frame 23 has suitable carriage slide guides for moving a carriage 24 along a first direction. The carriage 24, in turn, movably supports an actuator 25 for advancing the same actuator 25 along a second axis perpendicular to the first axis.

The actuator 25 sustains the feeder 13 and therefore the respective feed head 8 and it is in turn equipped with a movement system for moving the feeder 13 and the head 8 along a third axis perpendicular to the first and the second axis.

In this manner, the head 8 is pivotable along the three spatial axes for realization of the object 10.

Note that the support surface 22, which is arranged below the feed head 8, can, in turn, be movable towards/away from the feed head 8. In this case, the actuator 25 can sustain the feeder 13 in a fixed manner, in that the movement along the third axis is determined by the movement of the support surface 22 with respect to the head 8.

The present invention also regards a method for three-dimensional printing of continuous fibre composite materials which comprises the steps of: realizing a compound material 2 by immersing the continuous fibre 3 in the resin 6; and feeding the previously formed continuous fibre compound material 2.

This feeding process is implemented by exerting a drawing force on the compound material by means of relative movement between the feed head 8 and the three-dimensional object 10.

In other words, by moving the head 8 by means of the action of the numerically controlled machine 19, the material 2 that is gradually deposited so as to form the object 10 is drawn with consequent feeding of the material 2 and the fibre 3.

Advantageously, drawing of the material 2 also involves feeding the fibre 3, which is suitably directed so as to pass into the basin 9 containing the resin 6.

In further detail, to implement the printing process, the compound material 2 leaving the head 8 is initially distributed on the respective support surface 22. At this point, the material 2 is polymerized by the member 15 on the support surface 22 so as to define an anchoring point 26 for anchoring the compound material 2.

In other words, at the beginning of the process of depositing the compound material 2, part of the material 2 is already projecting out of the nozzle 14. When the apparatus 1 begins the printing process, the member 15 polymerizes the resin 6, enabling adhesion of the fibre 3 to be support surface 22. The anchoring point 26 is thus formed and it enables the material 2 that has already been deposited and polymerized to draw, as the numerically controlled machine 19 moves, the fibre 3 upstream of the head 8.

The material 2 that is gradually supplied from the head 8 is polymerized and made to adhere to the other layers already deposited (by virtue of the adhesive characteristics of the resin 6), thus enabling the continuous drawing action affecting the fibre 3.

The feed head to 8 is thus moved by the machine 19 according to a predetermined path that defines the object 10 to be printed. This path is determined by suitable management software that is not described in the present description in that it does not fall within the scope of the invention.

At the end of the printing process, or in any case when continuous feeding of the material 2 must be interrupted, the material is cut by the blades 17 as described above (and then it continues to be deposited in another point of the printing plate).

Advantageously, the method described hereinabove makes it possible to realize manufactured articles without necessarily having to carry out conventional linear "slicing", that is to say, the division of the object to be printed into layers in a manner parallel to the printing plane. There being no constraints imposing the use of conventional slicing for construction of the object 10, any form in three-dimensional space can be followed in the present invention. The impregnated fibres 3 that are extruded are particularly suited to this implementation in that when the head 8 traces a line in the space, by feeding the material 2, simultaneous reticulation of the resin 6 toughens the fibre 3, which is capable of sustaining deformations in the subsequent steps of the process.

Moreover, by using optimized software for non-linear "slicing", it is possible to design and realize objects 10 orienting the fibres 3 along the direction of maximum stress. In this situation, the apparatus can be advantageously equipped with additional axes of rotation or even with robotic arms to increase its capacity to produce three-dimensional forms.

As regards the structure of the material 2, the method can also comprise a pre-impregnation step for pre-impregnating the fibres when the latter are in the form of thin filaments and then assemble the filaments to form the fibre 3 or more complex structures like cords, braids, etc.

This solution entails the use of a system of idler rollers and basins through which the thin filaments are passed before being conveyed to the feed head 8. The fibres 3 can also be pre-treated so as to improve chemical adhesion with the resin 6.

Moreover, the step of realizing the compound material 2 can comprise the additional substep of mixing particulate and/or fibrous fillers into the compound material 2 following passage of the fibre 3 inside the basin 9. In this manner, the formation of the compound material 2 proves to be more versatile in that it can be obtained with any type of substance according to various needs regarding realization. For example, owing to the use of fibrous fillers, the joining of the layers in the step of depositing the material 2 can be improved.

In addition, in a further, alternative embodiment, the resin is partially reticulated before the whole material 2 is deposited.

In this manner, the fibre 3 obtained can be more easily managed compared to a filament impregnated only with a liquid resin, and at the same time, it is sufficiently flexible to be extruded and deposited without problems.

This solution is particularly advantageous in the case in which the fibres 3 processed are of a material that obstructs to a greater degree the reticulation of liquid photo-reticulable resins 6 such as carbon, Kevlar, etc.

The present invention resolves the problems observed in the prior art and leads to the significant advantages.

Firstly, it should be noted that the apparatus 1 and the relative method for three-dimensional printing make it possible to realize the continuous fibre composite material properly. In other words, the present invention enables proper and homogeneous impregnation of the fibre 3 with the respective liquid resin 6.

This advantage is offered precisely by the step of realizing the material in which the fibre 3 is immersed in the basin 9 containing the resin 6. The time the fibre 3 remains inside the basin 9 is defined and measured as a function of the characteristics of the materials used, so as to ensure proper formation of the material at all times, regardless of the structure of the fibre 3 and/or the viscosity of the resin 6.

A further advantage of the present invention is determined by the step of feeding the compound material 2, which ensures proper dispensing and deposition of the material 2 that will constitute the object 10.

As described above, the feeding of the material 2 is determined by the relative movement between the head 8 and the object 10, which involves a drawing action affecting the fibre 3. Accordingly, the material 2 is supplied from the head 8 only after movement of the same head 8 and the feeding thereof does not depend on the structure (viscosity) of the resin.

Accordingly, the printing apparatus 1 and the relative method prove to be versatile and they can be used for any type of continuous fibre composite material.

The invention claimed is:

1. An apparatus for three-dimensional printing of continuous fiber composite materials, comprising:
    a feed head for feeding a compound material of continuous fiber, comprising an outlet nozzle for the compound material of continuous fiber to print a three-dimensional object;
    a movement device for relative movement between the feed head and the three-dimensional object, the movement device comprising at least one numerically controlled machine having numerically controlled movement along at least three axes; and
    a station for realizing the compound material of continuous fiber, the station for realizing the compound material of continuous fiber being arranged upstream of the feed head;
    a polymerization member arranged outside of the outlet nozzle and directed towards the nozzle in an exit zone for the compound material of continuous fiber from the nozzle for polymerizing the compound material of continuous fiber leaving the outlet nozzle so as to define a continuing succession of anchoring points;
    wherein the numerically controlled machine comprises a motorized arm for supporting the feed head at a respective end portion, the motorized arm being configured to exert a drawing force on the compound material of continuous fiber leaving the feed head with respect to a lastly defined one of the anchoring points to passively draw the compound material of continuous fiber out of the feed head; the nozzle being configured to shield the compound material from the polymerization member.

2. The apparatus according to claim 1, wherein the station for realizing the compound material of continuous fiber comprises a basin for containing a resin for immersing a continuous fiber during the process of drawing the continuous fiber through the resin contained in the basin.

3. The apparatus according to claim 2, wherein the station for realizing the compound material of continuous fiber comprises a feed line of the continuous fiber for guiding the continuous fiber from a collection element for collecting the continuous fiber, through the basin, and to the feed head, the feed line having a plurality of idler rollers for the continuous fiber.

4. The apparatus according to claim 2, wherein the basin for containing the resin comprises a feeder that has a first open inlet end for the continuous fiber, and a second open exit end for the compound material and opposite the first end, the second open end defining the feed head for feeding the compound material of continuous fiber.

5. The apparatus according to claim 4, wherein the station for realizing the compound material of continuous fiber further comprises a feed line of the continuous fiber for guiding the continuous fiber from a collection element for collecting the continuous fiber, to the first open inlet end of the feeder.

6. The apparatus according to claim 3, wherein the collection element for collecting the continuous fiber comprises a spool around which the continuous fiber is wound, the spool being rotatable to unwind the continuous fiber during the respective process of the continuous fiber being drawn as determined by the movement device between the feed head and the three-dimensional object.

7. The apparatus according to claim 1, wherein the numerically controlled machine comprises, below the feed head, a support surface for the three-dimensional object that is being printed, the support surface being movable towards and away from the feed head.

8. The apparatus according to claim 7, wherein the feed head further comprises a cutting member for cutting the compound material of continuous fiber so as to interrupt a supply of the compound material of continuous fiber leaving the outlet nozzle.

9. A method for three-dimensional printing of continuous fiber composite materials, comprising the steps of:
    realizing a compound material of continuous fiber by immersing a continuous fiber in a resin;
    subsequently feeding the compound material of continuous fiber so as to print a three-dimensional object on a printing surface;

implementing the feeding by exerting a drawing force on the compound material of continuous fiber by relative movement between a feed head for feeding the compound material of continuous fiber and the printing surface or the three-dimensional object, the exerting the drawing force comprising the steps of:

distributing the compound material of continuous fiber leaving the feed head onto a support surface;

polymerizing the compound material of continuous fiber as the compound material of continuous fiber leaves the feed head during the relative movement so as to define a continuing succession of anchoring points and to stabilize the compound material of continuous fiber in a solid state;

moving the feed head with respect to a lastly defined one of the anchoring points according to a predetermined path to passively draw the compound material of continuous fiber out of the feed head to define the three-dimensional object to be printed.

10. The method according to claim 9, and further comprising implementing the step of realizing the compound material of continuous fiber during the exerting the drawing force on the compound material of continuous fiber, having the continuous fiber pass through the resin contained in a basin.

11. The method according to claim 10, wherein the step of realizing the compound material of continuous fiber comprises a substep of guiding the continuous fiber from a collection element for collecting the continuous fiber, through the basin, and to the feed head.

12. The method according to claim 11, wherein the step of realizing the compound material of continuous fiber comprises a substep of mixing at least one chosen from particulate and fibrous fillers into the compound material of continuous fiber after passage of the continuous fiber through the basin.

13. The method according to claim 11, and further comprising implementing the substep of guiding the continuous fiber by unwinding the continuous fiber from a spool around which the continuous fiber is wound by exerting a drawing force on the continuous fiber with a movement device, the spool constituting the collection element for collecting the continuous fiber.

14. The method according to claim 13, wherein the substep of exerting the drawing force on the continuous fiber comprises a step of moving the support surface for the three-dimensional object towards/away from the feed head.

15. The method according to claim 9, and further comprising implementing the movement of the feed head with a machine having numerically controlled movement along at least three axes.

16. The method according to claim 9, and further comprising a final step of cutting the compound material of continuous fiber leaving the feed head so as to interrupt a supply of the compound material of continuous fiber.

17. The method according to claim 9, wherein the polymerization step comprises:

a first step performed with electromagnetic radiation to activate only a part of the resin forming the compound material obtaining a semi-finished product;

a second step performed with a thermal radiation to complete a polymerization process of the semi-finished product so as to define the succession of anchoring points.

18. The apparatus according to claim 1, wherein the polymerization member is a combined member comprising a first source configured to produce an electromagnetic radiation and a second source configured to produce a thermal radiation.

* * * * *